United States Patent [19]

Mallow

[11] 3,990,903

[45] Nov. 9, 1976

[54] HYDROTHERMAL CEMENT AND METHOD OF CEMENTING WELL BORES

[75] Inventor: William A. Mallow, San Antonio, Tex.

[73] Assignee: Southwest Research Institute, San Antonio, Tex.

[22] Filed: Apr. 16, 1975

[21] Appl. No.: 568,664

Related U.S. Application Data

[63] Continuation-in-part of Ser. No. 381,729, July 23, 1973, abandoned.

[52] U.S. Cl. ................................. 106/84; 106/85; 166/292
[51] Int. Cl.² ........................................ C04B 19/04
[58] Field of Search ................. 106/84, 85, 90, 120; 166/292, 293

[56] References Cited
UNITED STATES PATENTS

| | | | |
|---|---|---|---|
| 3,146,828 | 9/1964 | Mann | 106/84 |
| 3,146,829 | 9/1964 | Mann | 106/84 |
| 3,207,624 | 9/1965 | Burrage et al. | 106/84 |

Primary Examiner—J. Poer
Attorney, Agent, or Firm—Fulbright & Jaworski

[57] ABSTRACT

A hydrothermal cement composition consisting essentially of (a) a polyvalent metal ion source, (b) water, and (c) a hydratable silica source wherein the silica becomes available for chemical combination with the polyvalent metal salt upon application of heat. A method of cementing a string of pipe in a bore hole including the steps of preparing such a cement composition, pumping the cement composition into the annular space between the string of pipe and the walls of the bore hole, and allowing the cement to set due to the temperature of the bore hole or by passage of time or both.

16 Claims, No Drawings

HYDROTHERMAL CEMENT AND METHOD OF CEMENTING WELL BORES

CROSS-REFERENCES TO RELATED APPLICATIONS

This is a continuation in part of application Ser. No. 381,729 filed July 23, 1973 now abandoned for "Hydrothermal Cement and Method of Cementing Well Bores", now abandoned in favor of this application.

BACKGROUND OF THE INVENTION

Portland cement is prepared conventionally by grinding limestone and clay and/or other materials to a fine powder, mixing thoroughly, and burning the mixture in a long rotary kiln. At the hot zone of the kiln, where the temperature approaches 3000° F., the mixture is sintered and fused together into nodules called clinker which is ground to a find powder. Substantial fuel is required to serve the energy demand for this low cost, high volume conventional cement material, and, as in all energy consuming industries, fuel shortages curtail cement production. Hence, a need exists for low energy consuming cements in building materials.

The possibility of fossil fuel shortages and accompanying demand for high energy fuels has spurred efforts to recover geothermal energy as well as petroleum gas deposits trapped in very deep cavities and to liberate these reserves. Nuclear devices have been proposed as fracturing methods to stimulate production of high yields. However, the combination of inherently high subterranean temperature and the added thermal influx from nuclear stimulation poses a serious threat to the stability of cements used to reinforce the casing and walls of the wells and to secure the casings to wells in desired configurations for attachment to aboveground piping and valve assemblies. The high temperature gradients that define the thermal profile of these walls constitute a source of variable stress between cement and steel casing. The high coefficient of thermal expansion of metal compared to concrete (in the range of 5–50 to 1) can induce adhesive failure if the cement bond is not satisfactory. Conventional Portland cements rapidly lose adhesive strength at elevated temperatures (i.e., 300° F. and higher) and possess only marginal strength under optimum temperature conditions. For example, the shear bond of Portland cement to Re Bar (conventional steel reinforcing rods) averages 500 psi while the shear bond of Portland cements to conventional polished steel is only 50 psi. The added stress of thermal degradation would render a Portland cement useless in regard to adhesion in wells of the nature described above. Consequently, the need exists for a high strength cement exhibiting high shear bond and adhesion properties for the use described.

In the drilling of conventional oil and gas wells, casing is cemented not only to secure the casing in the bore hole but also to prevent communication between water, oil and gas-producing zones within the well. The typical procedure for cementing wells of this nature involves mixing Portland cement compositions at the well site and pumping the cement downwardly through casing and then outwardly and upward through a well between the casing and the wall of the bore hole. Ordinarily, a plurality of high pressure pumps and piping systems are required to guard against pump failure. In the event of pump failure, the cement sets almost immediately and hardens, thereafter requiring expensive drilling operations to salvage the well. Thus, it would be advantageous to provide a method of cementing a string of pipe in a bore hole whereby the cement will not set, harden or cure except by passage of time or by exposure of the cement to given temperature conditions that exist within the well or both. The present invention is directed to such method which eliminates the necessity of equipping cementing systems with duplicate pumps and related apparatus and which virtually eliminates the hazard of the cement setting before the desired time which might lead to loss of the well.

Applicant is aware of prior art in the field including U.S. Pat. Nos. 1,318,076, 1,852,672, 2,042,011, 2,238,930, 2,279,262, 2,302,913, 2,502,418, 2,586,814, 2,665,996, 2,682,092, 2,701,209, 2,805,719, 2,883,723, 2,895,838, 3,146,828, 3,180,748, 3,208,523, 3,244,230, 3,253,664, 3,317,643, 3,326,269, 3,736,163, 3,374,834, 3,435,899 and 3,581,825, and an article entitled "Effect of Jet Perforating on Bond Strength of Cement" by W. K. Godfrey, Journal of Petroleum Technology, pages 1301–14, November 1968. Of the foregoing, Applicant deems the most pertinent to be U.S. Pat. Nos. 1,852,672, 2,665,996, 3,146,828, 3,326,269 and 3,736,163.

The U.S. Pat. No. 1,852,672 patent is directed to pozzolanic activity of active clay minerals with alkaline earth oxides such as calcium and magnesium. The U.S. Pat. No. 3,326,269 patent teaches the fixation of free silica by the high temperature firing of mixtures of colloidal silica and the hydroxide of various colloidal polyvalent metals. Neither patent is concerned with reactions or products subject of the present invention.

The U.S. Pat. No. 3,146,828 teaches the use of heat to generate a rigidized mineral mass of highly porous silicate and silica of moderately low strength (1546 psi in the highest case). It teaches the use of the material to form a consolidating barrier of a permeable structure within the formation surrounding the well bore, the purpose of which is to aid the fracturing of formations and assure a continuous recovery of fluids. The bonding or cementitious material is defined as being sodiun silicate to which is added a zinc oxide stabilizing agent in the amount of 0.5 to 2.0 parts by weight to reduce the water sensitivity. The patent disclaims any benefits of greater amounts of zinc oxide (column 6, lines 54 to 59) and describes a process wherein sodium silicate solutions are dehydrated thermally at such a rate (indicated by the minimum temperature shown as 175° F.) that a porous film results which serves as a binder. It has been found in practice that the cement of the U.S. Pat. No. 3,146,828 is a water-vapor sensitive product, one which is stable at low humidity but softens and degrades at 175° at 100% relative humidity within 24 hours of exposure. When formulations such as those described in column 5, lines 6 through 75, and column 6, lines 1 through 60, are prepared and cured under closed autoclave conditions at 175° F. and 100% relative humidity for 5 days, a plastic non-rigid product results unless the sample is allowed to dehydrate. Where evaporation is permitted or induced, the cement does harden. If such a formulation is charged into a well whose formation permits water vapor transfer from the cement, a hardening will result. If the formation is tight or if the cement is cast between non-porous steel casings as is often done, the cement may fail to set firmly and may not achieve the porosity claimed by the inventor as critical to the invention (column 5, lines -16). Thus the U.S. Pat. No. 3,146,828 formulations have definite limitations.

The U.S. Pat. No. 2,665,996 describes a hydrated calcium silicate-crystalline product that is unstable at temperatures above 450° F. and reacts at room temperature as well as elevated temperatures. Furthermore, the U.S. Pat. No. 2,665,996 product does not have the property of adhesion to steel. By comparison, the composition of the present invention is a hydrothermally reacted product, inert or unreactive at room temperature while reactive at higher temperatures with the consequent benefits of remaining mobile or pumpable for long periods of time at less than the threshold of activation temperatures. Furthermore, the product of the present invention cures to a heat-resistant solid with great adhesive strength to steel and resistance to acids and is an amorphous, polymeric, non-crystalline and non-hydrous solid as compared with that of the U.S. Pat. No. 2,665,996.

U.S. Pat. No. 3,736,163 discloses a lightweight insulative product consisting of mineral wool type fibers bonded together with calcium silicate moieties which become partially mineralized during use. The product of the U.S. Pat. No. 3,736,163 is cured in any autoclave at 200 psi steam (400° F.) for 3 hours, then dried and has negligible adhesion to metal and is a crystalline hydrate of dicalcium silicates that are initially partially dehydrated before released for use. The product of the U.S. Pat. No. 3,736,163 process survives temperatures of not greater than 1200° F. because of stress relief by way of microfractures and microstrain dissipated by the fiber fillers. When the same compositions (875 pounds lime and 750 pounds of uncalcined diatomaceous earth, 150 pounds of anhydrous sodium silicate, 7 pounds of sugar, 60 pounds of nodulated mineral wool, 60 pounds of sulfite pulp fibers and 50 pounds of clay in 720 gallons of water) is autoclaved as described in the U.S. Pat. No. 3,736,163, a product which is a mixture of crystalline calcium silicates is obtained as confirmed by x-ray analysis.

By comparison, the vastly different composition of the present invention contains, for example, minimal amounts of water as compared with the U.S. Pat. No. 3,736,163. Minimal water in the product of the present invention allows reaction to form polymers of non-crystalline and non-hydrous solids that provide resistance to high temperature thereby dispensing with the necessity of fibers as in the U.S. Pat. No. 3,736,163 for the purpose of dissipating stresses.

SUMMARY OF THE INVENTION

The present invention relates to a family of cements characterized by hydrothermally initiated curing, the cement mixture retaining mobility or pumpability at less than the threshold activation temperature that initiates the cure. Objectives of the invention are to provide such a cement of high strength and curable by a substantially greater than conventional passage of time or by exposure to elevated temperature or both; a method for cementing a string of pipe in a bore hole through use of such hydrothermal cement composition; a cement composition eminently suitable and stable when cured for use in high temperature wells drilled into the earth; and to minimize energy or fuel requirements in preparation of cement compositions.

A hydrothermal cement is defined herein as one that achieves a high degree of mechanical strength under somewhat higher than standard atmospheric temperature and pressure conditions, by in situ formation of polyvalent silicate salts from reacting silica and metal oxides, hydroxides or salts of low solubility. The reaction of silica and metal oxides or hydroxides and formation of polyvalent silicate salts involves a mechanism requiring heat and moisture to promote chemical combination of the basic constituents. Polyvalent metal oxides, hydroxides or salts that are capable of combination with silica gel or silicates in an aqueous medium are induced to form the respective silicates by application of heat to aqueous slurries of these materials with silica flour and alkali metal silicates. The latter serve as reagents which react with the metal oxides to form silicates and alkali metal oxide or hydroxide. The caustic by-product is free to react with silica from the sand and silica flour of the formulation, and the resultant materials generate a reactive sodium silicate which repeats the cycle until either the polyvalent metal is exhausted, the water evporates or all of the silica is depleted or otherwise unavailable.

As used herein, the terms initiation temperature and activation temperature both refer to the minimum temperature at which the foregoing described reactions being and below which the materials simply are in physical mixture. Advantageously, the initiation temperatures of the family of hydrothermal cements of the present invention vary according to the types of polyvalent metal ions and the ratio of $SiO_2/Na_2O$ in the sodium silicate used. Consequently, setting of the cements of the present invention does not occur with normal passage of time until the cement is exposed to a temperature high enough to cause activation of the reactions. This features of the formulation according to the present invention uniquely adapts the cement compositions for use in cementing casing in well bores and the like. The cement has high strength and is also well suited for many other uses.

It is, therefore, an object of the present invention to provide a family of cements characterized as susceptible of hydrothermally initiated cure, the cementitious mixture remaining mobile or pumpable for long periods of time at less than the threshold of activation temperatures.

A further object of the present invention is the provision of a family of cements comprising high molecular weight, inorganic polymers from the reaction of polyvalent metals with silica under conditions of moisture and elevated temperatures.

A further object of the present invention is the provision of hydrothermal cements, each comprising a mixture of a polyvalent metal salt, water and a silica source that can be hydrated by time or temperature such that the silica is available for combination with the polyvalent metal salt upon application of heat.

A still further object of the present invention is the provision of a method of cementing pipe or casing within a well bore wherein a hydrothermal cement of the foregoing composition is prepared and pumped into the annular space between the pipe and walls of the bore hole and then allowed to set due to temperature conditions in the bore hole or by passage of time or both.

Yet a further object of the present invention is the provision of such a method that reduces the necessity of duplicative pumping and circulating equipment inasmuch as failure of such equipment does not in and of itself result in setting of the cements in a bore hole.

A still further object of the present invention is the provision of such a method whereby the cement may be mixed offsite, is transported to the site and may be held for long periods of time relative to Portland cement before use and before setting occurs.

A further object of this invention is the provision of a water-reducing reagent which minimizes the water required to obtain workability of a slurry containing cement forming reactants according to the present invention and hence optimizes the physical, mechanical and chemical properties of the cured cement.

A still further object of this invention is the provision of a coating, binder or building product of high mechanical strength, chemical resistance, abrasion resistance and resistance to intense and prolonged heating and heat cycling.

Other and further objects, features and advantages will be apparent in the following description of presently preferred embodiments of the invention, given for the purpose of disclosure.

DESCRIPTION OF THE PREFERRED EMBODIMENT

The cement composition of the present invention is formulated by blending dry components including the polyvalent metal ion source such as one of a polyvalent metal oxide, hydroxide, salts of low solubility, or mixtures thereof together with a silica source such as clay, silica, flour, silica sand and sodium silicates or equivalent substitutes. A water-reducing reagent comprising a spray dried hydrated sodium silicate powder is used to reduce the amount of water needed to fluidize the system. Preferably, the blending and mixing step is conducted in a closed container substantially free of air and water to prevent lumping because of moisture and to prevent carbonation of silicates by carbon dioxide in the air. The blend of dry materials is then slurried with the required (as will be explained) minimum amounts of water. Prolonged delay in adding water, especially in an humid environment, allows the powdered mixture to cake and subsequently makes it more difficult to disperse and hydrate. The consistency of the water/solid mixture undergoes a dramatic transition within ten minutes following the addition of water whereby a marked drop in viscosity converts an otherwise damp cake to a thin, pumpable slurry. This occurs as a consequence of the dissolution of the hydrated sodium silicate. The slurry viscosity can be varied drastically by adding relatively small (1 to 2% by weight) increments of water.

The polyvalent metal ion which is a reactant and ingredient of the cement composition according to the present invention is a polyvalent metal oxide, hydroxide, low solubility salt or mixture thereof. The polyvalent metal oxides, hydroxides, and salts that may be used include the oxides of zinc, magnesium, iron, aluminum, manganese, titanium, zirconium, vanadium and hafnium; the hydroxide of aluminum; the carbonates of zinc and magnesium; and the phosphates of calcium, magnesium and aluminum.

Examples of formulations making use of various of the polyvalent metal ion sources are as follows wherein particle size is less than the stated mesh, standard ASTM E11 analysis, unless otherwise indicated.

Example 1

| | Parts by Weight | |
|---|---|---|
| | Range | Preferred |
| Sand (20–60 mesh) | 40–60 | 50 |
| Silica flour (325 mesh) | 20–40 | 25 |
| 2.4/1 ratio $SiO_2/Na_2O$ Hydrated Sodium Silicate Powder (325 mesh) | 5–15 | 10 |
| 3.22/1 ratio $SiO_2/Na_2O$ Anhydrous Sodium Silicate Powder (325 mesh) | 5–15 | 10 |
| Flyash | 0–25 | 0 |
| Zinc oxide (<1 micron) | 5–15 | 7 |
| Water | 15–20* | 17* |

*Per hundred parts by weight of total solids ("phpts").

Using the preferred formulation, the cement begins to act at an activation temperature of 150° F. and sets firmly in 24 hours at this temperature. At 200° F., a hard cure is achieved in less than 24 hours. In about one week, the cement attains a compressive strength of 4000 psi at 200° F. and a shear bond of 1300 psi. The cured cement resists temperature to 2000° F. without adversely affecting its physical strength. In this example as in all subsequent examples, the procedure followed for determining compressive strength is ASTM C109-54T while the test for determining shear bond or adhesive strength is one used conventionally in the petroleum industry. It consists of measuring the force per unit area required to displace or disrupt the bond between a metal cylinder and a concrete cylinder.

Example 2

| | Parts by Weight | |
|---|---|---|
| | Range | Preferred |
| Sand | 40–60 | 50 |
| Silica flour | 20–40 | 25 |
| 2.4/1 ratio $SiO_2/Na_2O$ Hydrated Sodium Silicate Powder | 5–15 | 10 |
| 3.22/1 ratio $SiO_2/Na_2O$ Anhydrous Sodium Silicate Powder | 5–15 | 10 |
| Aluminum Hydroxide (reagent grade preferred from $NaAl_2O_3 + Nh_4OH$) | 5–20 | 7 |
| Water | 15–20 phpts | 17 phpts |

This formulation is indefinitely stable below 145° F. but rapidly begins to thicken at 200° F. No true setting is observed below 165° F. and the preferred activation temperature for finite rates of observable change in setting characteristics is 200° F. A cure of 2 weeks at 200° F. results in a compressive strength of over 2000 psi. Over 3000 psi, compressive strength is obtained at 200° in 4 weeks. Approximately 4000 psi is obtainable in 5 to 6 weeks at this temperature. At 300° F., strengths on the order of 4700 psi are obtainable in 2 weeks. The cement has a shear bond strength of 1300 psi and withstands temperatures of up to 1000° F. without adversely affecting its physical strength.

Example 3

| | Parts by Weight | |
|---|---|---|
| | Range | Preferred |
| Sand | 40–60 | 50 |
| Silica flour | 20–40 | 25 |
| 3.22/1 ratio $SiO_2/Na_2O$ Anhydrous Sodium Silicate Powder | 5–15 | 10 |
| 2.4/1 ratio $SiO_2/Na_2O$ Hydrated Sodium Silicate Powder | 5–15 | 10 |
| Aluminum Hydroxide (commercial grade from $NaAl_2O_3$ + steam) | 5–15 | 7 |
| Water | 15–20 phpts | 17 phpts |

Activation temperatures on the order of 225° F. result in a strength of 3700 psi in about 72 hours.

Example 4

|  | Parts by Weight | |
|---|---|---|
|  | Range | Preferred |
| Sand | 40–60 | 50 |
| Silica flour | 20–40 | 25 |
| 3.22/1 ratio $SiO_2/Na_2O$ Anhydrous Sodium Silicate Powder | 5–15 | 10 |
| 2.4/1 ratio $SiO_2/Na_2O$ Hydrated Sodium Silicate Powder | 5–15 | 10 |
| $Al_2O_3$ Calcined or Rehydrated | 5–15 | 7 |
| Water | 15–20 phpts | 17 phpts |

The lowest observed practical activation temperature for this formulation is 225° F. A temperature of 300° F. is preferred since this results in curing being substantially completed in a period of less than 2 weeks. A strength of 3700 psi is obtainable in about 72 hours with an activation temperature of 300° F.

Example 5

|  | Parts by Weight | |
|---|---|---|
|  | Range | Preferred |
| Sand | 40–60 | 50 |
| Silica flour | 20–40 | 25 |
| 7.5/1 ratio $SiO_2/Na_2O$ Anhydrous Sodium Silicate Powder | 5–15 | 10 |
| 2.4/1 ratio $SiO_2/Na_2O$ Hydrated Sodium Silicate Powder | 5–15 | 5 |
| Zinc oxide | 5–15 | 7 |
| Water | 15–20 phpts | 17 phpts |

The substitution of 7.5/1 ratio ($SiO_2/Na_2O$) sodium silicate for 3.22/1 ratio reduces the activation temperature from 150° to 135° F. The compressive strength of this recipe after 7 days at 135° F. is 3600 psi. If the more alkaline sodium silicates are used (ratio of 3/1 and less, i.e., 2/1 or 2.4/1 alone), no setting is observed in 5 days at 150° F. The 2.4/1 ratio silicate serves as a fluidizer or viscosity-improving additive during the handling of the cement mixture. The more alkaline silicates require higher temperatures and/or longer times to react and rigidize.

EXAMPLE 6

The formulations of Examples 1–5 may be used excluding or replacing the sodium silicates (hydrous and anhydrous) with sodium hydroxide in parts by weight of 1 to 10, 5 parts by weight being preferred. This substitution may be used without appreciable effect on the chemical or physical properties as indicated in each example. The kinetics of each formulation will be affected to some degree by the substitution.

As previously stated, formulations of the cement composition according to the present invention may be made using still other polyvalent metal oxides, hydroxides or salts. For example, the oxides of magnesium iron, aluminum, manganese, titanium, zirconium, vanadium and hafnium, the carbonates of zinc and magnesium and the phosphates of magnesium and aluminum may be used. Concentrations of any of these substitutes for the polyvalent metal compounds of Examples 1–6 should be proportioned to the relative equivalent weights of these compounds compared to the equivalent weights of the polyvalent metal compounds cited in these examples.

The inclusion of sodium silicates in these formulations is not a mandatory requirement but is preferred. Sodium silicate is produced by high energy-consuming processes, and in order to minimize inclusion of materials of this nature, the silicate may be generated in the cement system by the reaction of sodium hydroxide with available silica. Various clays, sands and ground sand are suitable sources of silica for this purpose.

Any washed sand used conventionally in Portland cement, concrete and mortar formulations may be used in the cement formulations of the present invention. The sand has lttle effect on strength of the resultant cement products but affects cost, fluidity and bulking factor of the cement mixture.

Silica flour likewise should be of low clay content and the proportions used dictate fluidity and strength of the set material versus time. That is, the more silica flour used, the less fluid is the cement mixture before setting but the greater strength after setting in given periods of time.

With regard to silicates used, anhydrous silicate is used partly as a matter of convenience to tie up free water that results after all reactions are concluded. The more silicate of this nature used, the faster the cure. The ratio of $SiO_2/Na_2O$ in the sodium silicate is a reaction rate controlling factor. The more siliceous grades (higher $SiO_2$ ratios) react more rapidly and at lower temperatures than the more alkaline grades.

With respect to the alkali metal silicate hydrate powders, which preferably are produced by conventional spray drying of alkali metal silicate solutions of a narrow range of $SiO_2/Na_2O$ ratios, the powders surprisingly have been found to produce a high degree of fluidity in slurries with very small quantities of water. This latter feature constitutes one source of the unique physical, chemical and mechanical properties described herein. Water, essential to the chemical curing of most inorganic cement systems is quantitatively critical to the final product properties. Any excess or residual water in a cured product evaporates leaving pores and sites of vulnerability to free-thaw damage, infusion of foreign matter, reduced strength, etc. Trapped water or waters of hydration common to all hydraulic cements like Portland limit the heat resistance of the products. Since the novel cement of the present invention employs only 15 to 20% moisture, a higher degree of impermeability and greater mechanical strength may be achieved than is possible otherwise. The addition of water induces a partial solution of the alkali metal hydrate powders which upon dissolution fluidizes the system by release of a colloided electrolyte that imposes a partial charge on the slurry inducing a high degree of lubricity where equivalent slurries without the electrolyte would appear as slightly dampened powders. This liquification does not occur immediately upon addition of water and its blending with the dry powders. After about 2 minutes with little or no agitation, the dampened mass suddenly liquifies to a highly fluid state which can be readily poured, pumped and extruded. This slurry can subsequently be rendered thixotropic by addition of any suitable bentonite product.

With respect to the polyvalent metal compounds used in each formulation, the concentration of the particular metal compound should be proportional to all others according to equivalent weights. Without the polyvalent metal compounds, all other constituents would remain relatively inactive.

With respect to water used in the formulations of the present invention, any clear water may be used as is used in conventional concrete and mortar formulations. The amount of water affects fluidity and final strength. That is, the more water used, the greater the fluidity of the mixture before setting but the lower the strength after set. Water is essential to promote reaction of silicate polymers and salts of the polyvalent metals.

Flyash and other pozzolanic materials may be used as fillers to perform the same function that sand performs as outlined above.

Concretes may be prepared by adding gravel and rock to mortar formulations of the present invention. Concretes prepared accordingly exhibit very low water absorption when cured, even after exposure to several hundred degree temperature. Consequently, the formulations of the present invention are uniquely suited for use in formulating building materials that are or may all be low energy produced in that no calcining or kiln processing is required to prepare the raw materials for the concrete, especially when the aforementioned sodium hydroxide-silica reaction is employed to generate sodium silicate.

As may be seen from the example, formulation of cement compositions according to the present invention by using different polyvalent metal compounds results in different formulations having varying activation temperatures. For example, the formulation of Example 1 has an activation of 150° F. and the formulation of Example 3 has an activation temperature of 225° F. As a result, it will now be apparent that a formulation may be selected having a specific activation temperature such that the formulation is uniquely adaptable for use in temperature environments wherein the cement remains mobile until subjected to a temperature high enough to activate setting and curing reactions. For example, various formulations of cement according to the present invention may be used in cementing pipe or casing within bore holes of wells drilled in the earth. Since temperature at a given point within a bore hole depends on depth of the well, the formulation used to cement the casing may be selected by determining temperature of the bore hole and comparing that temperature to the activated temperature of the various formulations of the present invention. For example, if the downhole temperature is approximately 150° F., the formulation of Example 1 may be used whereby the bore hole temperature of 150° F. causes the cement to set when finally placed in the well. However, below such temperature the cement remains mobile or pumpable for long periods of time relative to conventional Portland cements. In the same way, other cements from among formulations of the present invention may be selected for use in bore holes having different temperatures, necessitating use of formulations having corresponding activation temperatures.

In using cement formulations of the present invention for cementing casing in wells, the cement is prepared as explained elsewhere herein. The cement may be prepared at the well site although, advantageously, it may be prepared at points remote from the well site and shipped to the site without setting. Minimal agitation is required while holding the cement prior to use, the agitation serving merely to prevent stratification of the material. This feature of formulations according to the present invention is extremely significant when considering the mixing and transportation problems of conventional Portland cements.

The cement is then pumped into the annular space between the string of pipe or casing and the walls of the bore hole as in conventional processes. However, the need for standby pumping equipment is not as critical since the cement of the present invention will not set for several hours after being subjected to the activation temperature, thereby allowing adequate time for repair or replacement of the pumping equipment. Once in place in the well, pumping stops and the cement is allowed to set due to temperature of the bore hole or by passage of time or both. In this connection, cement formulations of the present invention having activation temperatures substantially lower than temperature of the bore hole may be used although shorter periods of time than those described in the examples will be experienced for setting and curing to take place. In any event, the ultimate strengths obtainable by the present cement are at least as great as those obtained by conventional Portland cements while the shear bond strength exceed those of Portland cement as indicated in the examples. Consequently, the cement formulations of the present invention provide adhesive strengths that greatly exceed those of conventional Portland cements and thereby uniquely adapt formulations of the present invention for use in high temperature bore holes such as geothermal wells and the like.

Still other uses of formulations according to the present invention may be made depending on temperature requirements and length of time available for setting and curing. It will now be apparent to those skilled in the art that formulations of the invention may be used for a variety of applications.

The present invention, therefore, is well adapted to carry out the objects and attain the ends and advantages mentioned as well as others inherent therein. While presently preferred embodiments of the invention have been given for the purpose of disclosure, numerous changes in the details of formulations and operation of the methods involved can be made which will readily suggest themselves to those skilled in the art and which are encompassed within the scope of the invention and the scope of the appended claims.

What is claimed is:

1. A cement composition characterized as a pumpable slurry susceptible to a hydrothermally initiated cure, consisting essentially of
   a. from about 5 to about 15 parts by weight of a polyvalent metal ion source,
   b. from about 15 to about 20 parts by weight of water per hundred parts by weight of total solids,
   c. from about 60 to about 100 parts by weight of a silica source hydratable under time and temperature conditions through reactions wherein the silica becomes available for chemical combination with the polyvalent metal ion source (a) upon application of heat, and
   d. from about 5 to 15 parts by weight of a water reducing reagent comprising a spray dried sodium silicate hydrate powder.

2. The cement composition of claim 1 wherein, more specifically,
   a. the polyvalent metal ion source consists of about 7 parts by weight of zinc oxide,
   b. water is present in the amount of about 17 parts by weight per hundred parts by weight of total solids,
   c. the silica source includes,
      i. about 50 parts by weight sand,
      ii. about 25 parts by weight silica flour,
      iii. about 10 parts by weight anhydrous sodium silicate powder, and d. the water reducing reagent consists of about 10 parts by weight of spray dried hydrated sodium silicate powder.

3. The cement composition of claim 1 including additionally up to about 25 parts by weight flyash.

4. The cement composition of claim 1 wherein, more specifically,
   a. the polyvalent metal ion source consists of about 7 parts by weight of reagent grade aluminum hydroxide,
   b. water is present in the amount of about 17 parts by weight per hundred parts by weight of total solids, and
   c. the silica source includes,
      i. about 50 parts by weight sand,
      ii. about 25 parts by weight silica flour,
      iii. about 10 parts by weight anhydrous sodium silicate powder, and
   d. the water reducing reagent consists of about 10 parts by weight of spray dried hydrated sodium silicate powder.

5. The cement composition of claim 1 wherein, more specifically,
   a. the polyvalent metal ion source consists of about 7 parts by weight of commercial grade aluminum hydroxide,
   b. water is present in the amount of about 20 parts by weight, and
   c. the silica source includes,
      i. about 50 parts by weight sand,
      ii. about 25 parts by weight silica flour,
      iii. about 10 parts by weight anhydrous sodium silicate powder, and
   d. the water reducing reagent consists of about 10 parts by weight of spray dried hydrated sodium silicate powder.

6. The cement composition of claim 1 wherein, more specifically,
   a. the polyvalent metal ion source consists of about 7 parts by weight aluminum oxide,
   b. water is present in the amount of about 17 parts by weight per hundred parts by weight of total solids,
   c. the silica source includes,
      i. about 50 parts by weight sand,
      ii. about 25 parts by weight silica flour,
      iii. about 10 parts by weight anhydrous sodium silicate powder, and
   d. the water reducing reagent consists of about 10 parts by weight of spray dried hydrated sodium silicate powder.

7. A cement composition characterized as a pumpable slurry susceptible to a hydrothermally initiated cure, consisting essentially of,
   a. from about 5 to about 15 parts by weight of a polyvalent metal ion source,
   b. from about 15 to about 20 parts by weight of water per hundred parts by weight of total solids,
   c. a silica source hydratable under time and temperature conditions through reactions wherein the silica becomes available for chemical combination with the polyvalent metal ion source (a) upon application of heat, the silica source comprising,
      i. from about 40 to about 60 parts by weight of sand,
      ii. from about 20 to about 40 parts by weight of silica flour, and
   d. from about one to about 10 parts by weight of sodium hydroxide as a sodium silicate precursor.

8. The cement composition of claim 7 wherein, more specifically, th sodium hydroxide (d) is present in an amount of about 5 parts by weight.

9. A method of cementing a string of pipe in a bore hole, comprising the steps of,
   1. preparing a cement composition as a pumpable slurry susceptible of a hydrothermally initiated cure, consisting essentially of
      a. from about 5 to about 15 parts by weight of a polyvalent metal ion source,
      b. from about 15 to about 20 parts by weight of water per hundred parts by weight of total solids,
      c. from about 60 to about 100 parts by weight of a silica source hydratable under time and temperature conditions through reactions wherein the silica becomes available for chemical combination with the polyvalent metal ion source (a) upon application of heat, and
      d. from about 5 to about 15 parts by weight of a water reducing reagent comprising a spray dried sodium silicate hydrate powder,
   2. pumping the cement composition into an annular space between the string of pipe and the walls of the bore hole, and
   3. allowing the cement to set due to the temperature of the bore hole or by passage of time or both.

10. The method of claim 1 wherein, more specifically,
    a. the polyvalent metal ion source consists of about 7 parts by weight of zinc oxide,
    b. water is present in the amount of about 17 parts by weight per hundred parts by weight of total solids,
    c. the silica source includes,
       i. about 50 parts by weight sand,
       ii. about 25 parts by weight silica flour,
       iii. about 10 parts by weight anhydrous sodium silicate powder, and
    d. the water reducing reagent consists of about 10 parts by weight of spray dried hydrated sodium silicate powder.

11. The method of claim 9 including, additionally, up to about 25 parts by weight flyash.

12. The method of claim 9 wherein, more specifically,
    a. the polyvalent metal ion source consists of about 7 parts by weight of reagent grade aluminum hydroxide,
    b. water is present in the amount of about 17 parts by weight per hundred parts by weight of total solids,
    c. the silica source includes,
       i. about 50 parts by weight sand,
       ii. about 25 parts by weight silica flour,
       iii. about 10 parts by weight anhydrous sodium silicate powder, and
    d. the water reducing reagent consists of about 10 parts by weight of spray dried hydrated sodium silicate powder.

13. The method of claim 9 wherein, more specifically,
    a. the polyvalent metal ion source consists of about 10 parts by weight of commercial grade aluminum hydroxide,
    b. water is present in the amount of about 17 parts by weight per hundred parts by weight of total solids,
    c. the silica source includes,
       i. about 50 parts by weight sand,
       ii. about 25 parts by weight silica flour, iii. about 10 parts by weight anhydrous sodium silicate powder, and
d. the water reducing reagent consists of about 10 parts by weight of spray dried hydrated sodium silicate powder.

14. The method of claim 9 wherein, more specifically,
a. The polyvalent metal ion source consists of about 7 parts by weight aluminum oxide,
b. water is present in the amount of about 17 parts by weight per hundred parts by weight of total solids,
c. the silica source includes,
i. about 50 parts by weight sand,
ii. about 25 parts by weight silica flour,
iii. about 10 parts by weight anhydrous sodium silicate powder, and
d. the water reducing reagent consists of about 10 parts by weight of sprayed dried hydrated sodium silicate powder.

15. The method of claim 9, consisting essentially of
a. from about 5 to about 15 parts by weight of a polyvalent metal ion source,
b. from about 15 to about 20 parts by weight of water per hundred parts by weight of total solids,
c. a silica source hydratable under time and temperature conditions through reactions wherein the silica becomes available for chemical combination with the polyvalent metal salt (a) upon application of heat, the silica source comprising,
i. from about 40 to about 60 parts by weight of sand,
ii. from about 20 to about 40 parts by weight of silica flour, and
d. from about 1 to about 10 parts by weight of sodium hydroxide as a sodium silicate precursor.

16. The method of claim 15 wherein, more specifically, the sodium hydroxide (d) is present in an amount of about 5 parts by weight.

* * * * *

UNITED STATES PATENT OFFICE
CERTIFICATE OF CORRECTION

PATENT NO. : 3,990,903
DATED : November 9, 1976
INVENTOR(S) : William A. Mallow

It is certified that error appears in the above-identified patent and that said Letters Patent are hereby corrected as shown below:

Column 1, line 55, change "use" to -- uses --

Column 4, line 19, change "evporates" to -- evaporates --

Column 4, line 27, change "types" to -- type --

Column 4, line 33, change "features" to -- feature --

Column 8, line 7, change "lttle" to -- little --

Column 12, line 2, change "th" to -- the --

Column 12, line 27, change "claim 1 " to -- claim 9 --

Signed and Sealed this

Fifteenth Day of February 1977

[SEAL]

Attest:

RUTH C. MASON
Attesting Officer

C. MARSHALL DANN
Commissioner of Patents and Trademarks